(12) United States Patent
Ko

(10) Patent No.: US 6,633,471 B1
(45) Date of Patent: Oct. 14, 2003

(54) OVERCURRENT PROTECTION CIRCUIT, ELECTRIC LEAKAGE PROTECTION CIRCUIT FOR AN ELECTRIC APPARATUS

(76) Inventor: Frank Ko, 3R 2th Fl, No.6, Ta-An, West St, Taichung (TW)

( * ) Notice: Subject to any disclaimer, the term of this patent is extended or adjusted under 35 U.S.C. 154(b) by 196 days.

(21) Appl. No.: 09/627,495

(22) Filed: Jul. 28, 2000

Related U.S. Application Data

(62) Division of application No. 09/296,866, filed on Apr. 22, 1999, now abandoned.

(51) Int. Cl.[7] .................................................. H02H 3/08
(52) U.S. Cl. ..................... 361/93.1; 361/93.5; 361/93.6; 361/102; 361/87
(58) Field of Search .................. 361/93.1, 87, 93.5, 361/93.6, 102

(56) References Cited

U.S. PATENT DOCUMENTS

| | | | | |
|---|---|---|---|---|
| 3,683,923 A | * | 8/1972 | Anderson | 128/908 |
| 4,237,887 A | * | 12/1980 | Gonser | 606/35 |
| 4,605,982 A | * | 8/1986 | Harner et al. | 361/87 |
| 5,847,913 A | * | 12/1998 | Turner et al. | 361/115 |
| 5,896,257 A | * | 4/1999 | Takahashi | 361/23 |

OTHER PUBLICATIONS

Gilbert, Joe "Technical Advances in Hall–Effect Sensing", p. 1.*

* cited by examiner

Primary Examiner—Gregory J. Toatley, Jr.
Assistant Examiner—Isabel Rodriguez
(74) Attorney, Agent, or Firm—Pro-Techtor International Services

(57) ABSTRACT

An overcurrent/leakage protection circuit installed in an electric socket or the like for over current/electric leakage protection, which includes a relay, a SCR (silicon controlled rectifier) which controls the relay, a trigger circuit which triggers the SCR, a constant current detector, and a micro current detection amplifier, wherein the relay has a common contact connected to a first power line, a normal close contact for power output of the first power line, and a normal open contact bridged to a second power line through an alarm lamp; the trigger circuit is driven to trigger the SCR upon detection of an overcurrent or short-circuit detected by the constant current detector or an electric leakage by the micro current detection amplifier, causing the normal close contact to be opened to cut off power supply from the load.

3 Claims, 4 Drawing Sheets

OVERCURRENT PROTECTION CIRCUIT, ELECTRIC LEAKAGE PROTECTION CIRCUIT FOR AN ELECTRIC APPARATUS

CROSS-REFERENCE TO THE RELATED APPLICATION

This is a divisional application of applicant's U.S. patent application Ser. No. 09/296,866, filed on Apr. 22, 1999 now abandoned.

BACKGROUND OF THE INVENTION

The present invention relates to electric protective means for overcurrent protection and electric leakage protection, and more particularly to such an overcurrent and electric leakage protective circuit means designed for use in an electric socket, an electric extension cable, etc.

An improper use of an electric apparatus may cause a short circuit, resulting in a fire. Electric extension cables with overcurrent protection devices are well known. These conventional overcurrent protection devices are commonly of mechanical type. These mechanical type overcurrent protection devices are less sensitive. If the user touches the positive and negative terminals of the power circuit by an error when using an electric extension cable or electric socket having a mechanical overcurrent protection device, or when an electric leakage occurs due to an insulator damage of the load such as motor, electric heater, air conditioner, electric ventilator, refrigerator, etc., the mechanical overcurrent protection device cannot automatically cut off power supply. Further, when several electric apparatus are simultaneously used, causing an overload or short-circuit, a fire accident may occur if the fuseless switch of the electric distributor does not break to cut off power supply from the loads.

SUMMARY OF THE INVENTION

The present invention has been accomplished under the circumstances in view. It is one object of the present invention to provide an overcurrent/short circuit protection circuit for an electric apparatus, which is of electronic design that automatically cuts off power supply within few microseconds after the occurrence of an overcurrent/short circuit. It is another object of the present invention to provide an electric leakage protection circuit for an electric apparatus, which automatically cuts off power supply when an electric leakage or electric shock happens. According to the present invention, the overcurrent protection circuit comprises an AC relay, a SCR (silicon controlled rectifier) which controls the AC relay, a trigger circuit which drives the SCR, a constant current detector served as a triggering signal source for the trigger circuit, and an alarm device, the AC relay having a common contact connected to a first power line, a normal close contact for electric current output of the first power line to which the common contact is connected, and a normal open contact bridged to a second power line through the alarm device. According to the present invention, the electric leakage protection circuit comprises an AC relay, a SCR (silicon controlled rectifier) which controls the AC relay, a trigger circuit which drives the SCR, a micro current detection amplifier served as a triggering signal source for the trigger circuit, and an alarm device, the AC relay having a common contact connected to a first power line, a normal close contact for electric current output of the first power line to which the common contact is connected, and a normal open contact bridged to a second power line through the alarm device.

DETAILED DESCRIPTION OF THE PREFERRED EMBODIMENT

Figure 1:
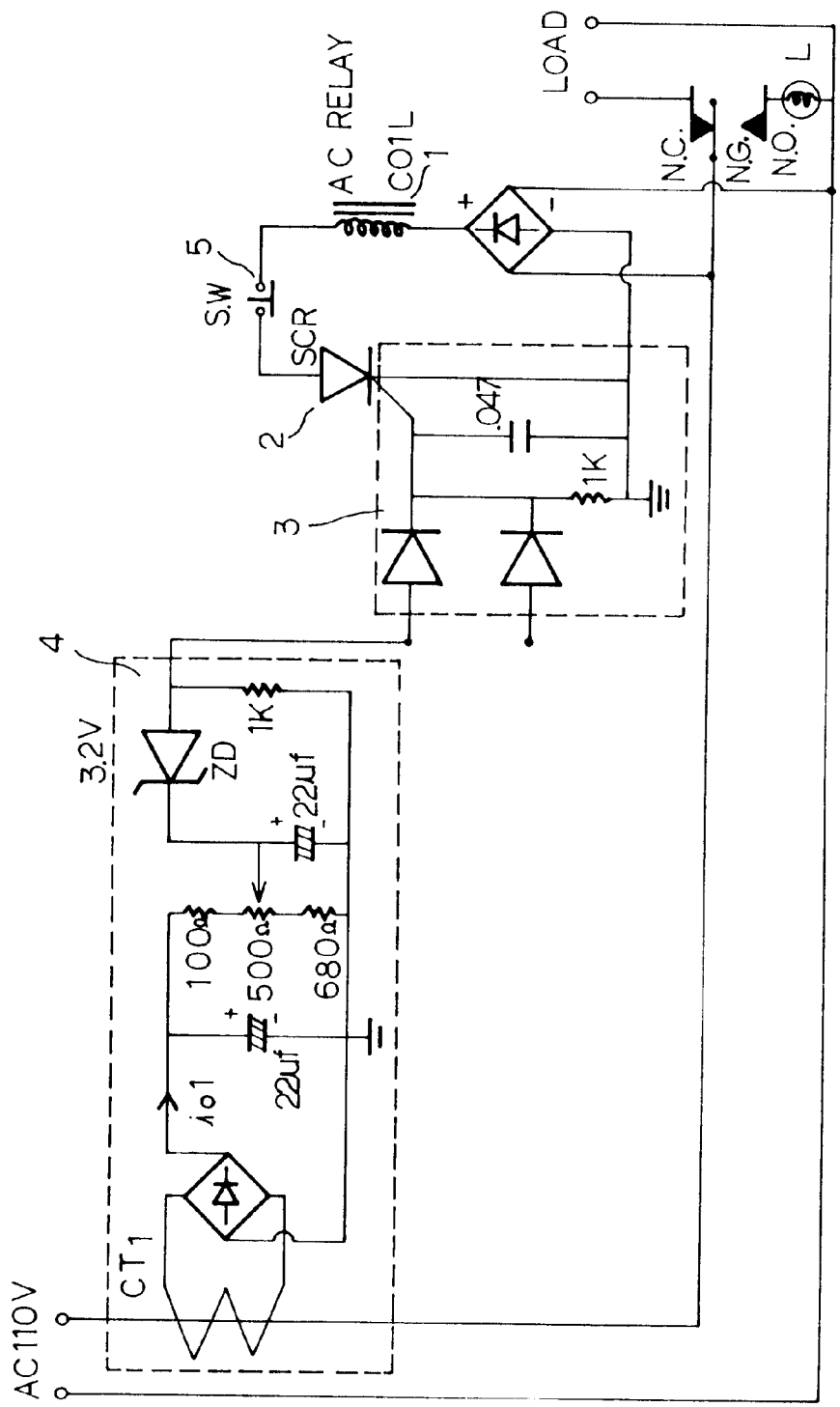
FIG. 1 is a circuit diagram of an overcurrent protection circuit according to the present invention.

Referring to FIG. 1, an overcurrent protection circuit is shown comprised of an AC relay 1, a SCR (silicon controlled rectifier) 2, which controls the AC relay 1, a trigger circuit 3 which drives the SCR 2, and a constant current detector 4 served as a triggering signal source for the trigger circuit 3. The common contact (N.G.) of the AC relay 1 is connected to one power line. The normal close contact (N.C.) of the AC relay 1 forms the output terminal of the power line to which the common contact (N.G.) of the AC relay 1 is connected. The normal open contact (N.O.) is bridged to another power line through an alarm lamp L. The constant current detector 4 is comprised of a current transformer $CT_1$ for detecting variation of electric current passing through. Further, a reset switch (SW) 5 is installed, and operated to break the SCR 2.

Under normal operation, electric current is normal, the SCR 2 is off, and the AC relay 1 does no work, therefore AC power supply is connected to the load through the normal close contact (N.C.) of the AC relay 1, and the alarm lamp L does no work. When the value of electric current surpasses the rated value of the load, the secondary output end $V_{01}$ of the current transformer $CT_1$ of the constant current detector 4 becomes:

$$V_{01} = K \frac{I_0}{n} R_L$$

in which, $K$ = coefficient of coupling
$I_0$ = line current
$n$ = number of turns at secondary side
$R_L$ = load at secondary side when the output end of $V_{01}$ is shunted through the shunt resistor and its output voltage surpasses $V_{ZD}$, it passes through OR gate of the diode to turn on the SCR 2, thereby causing the AC relay 1 to work and the normal close contact N.C. to be off, and therefore power supply is cut off to stop line current 1 from rising.

Figure 2:
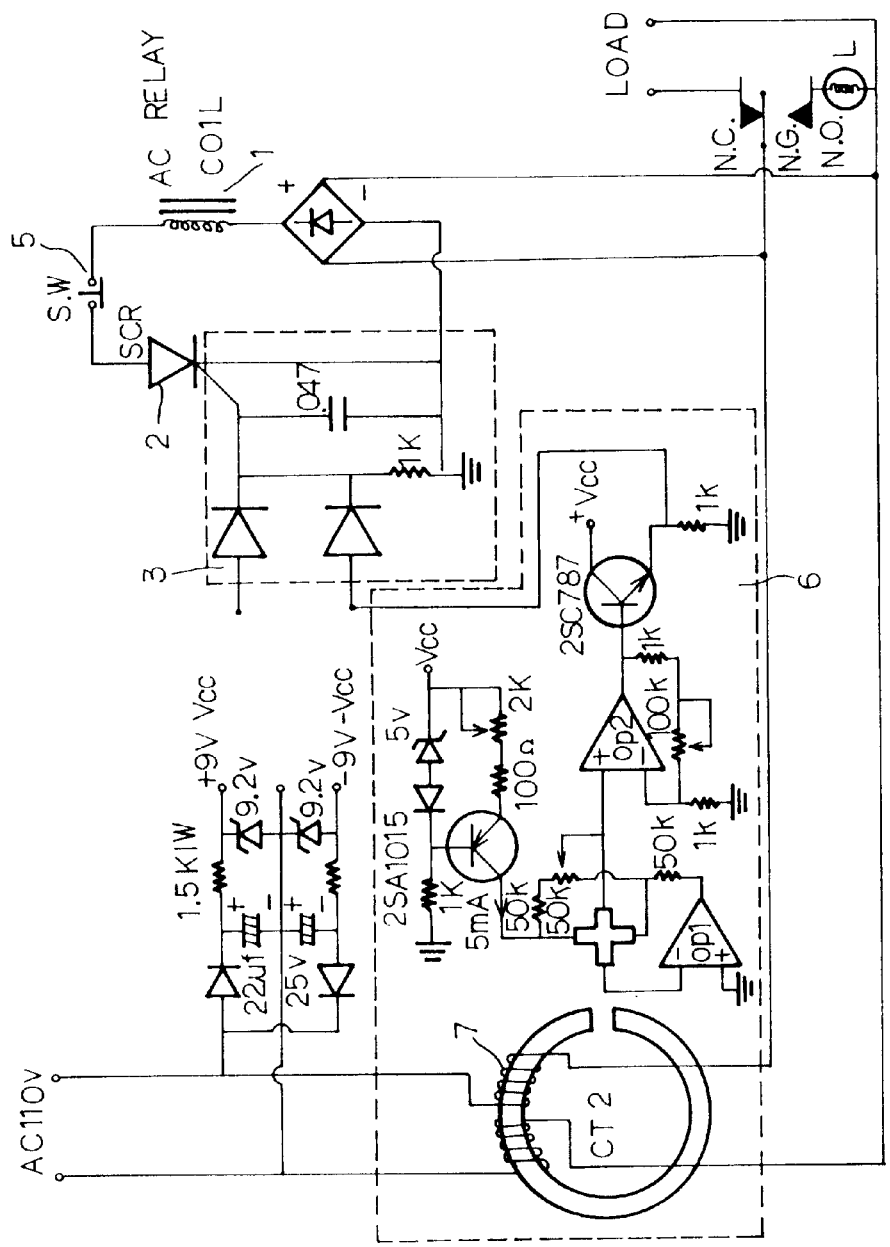
FIG. 2 is a circuit diagram of an electric leakage protection circuit according to the present invention.

Referring to FIG. 2, an electric leakage protection circuit is shown comprised of an AC relay 1, a SCR (silicon controlled rectifier) 2 which controls the AC relay 1, a trigger circuit 3 which drives the SCR 2, and a micro current detection amplifier 6 served as a triggering signal source for the trigger circuit 3. The common contact (N.G.) of the AC relay 1 is connected to one power line. The normal close contact (N.C.) of the AC relay 1 forms the output terminal of the power line to which the common contact (N.G.) of the AC relay 1 is connected. The normal open contact (N.O.) is bridged to another power line through an alarm lamp L. The micro current detection amplifier 6 uses an electric current transducer $CT_2$ of Hall effect current sensor to detect variation of electric current. A number of windings 7 are added to the core of the electric current transducer $CT_2$ to increase its sensitivity. Further, a reset switch (SW) 5 is installed, and operated to break the SCR 2.

Figure 4:
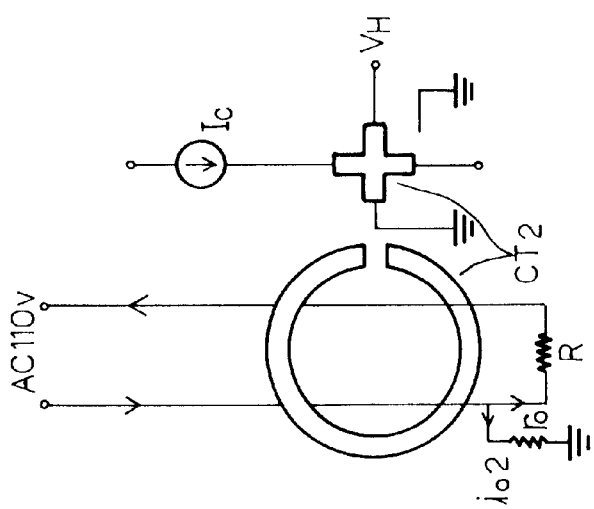
FIG. 4 explains the electric leakage detection operation according to the present invention.

Under normal operation, electric current is normal, the SCR 2 is off, and the AC relay 1 does no work, therefore AC power supply is connected to the load through the normal close contact (N.C.) of the AC relay 1, and the alarm lamp L does no work. When an electric leakage happens or the electric current passes through a person, as shown in FIG. 4, one phase of the power lines is connected to earth, electric current comes from the load of main power to earth, the resistance $r_0$ (load resistance) is about several tens of KΩ to several hundreds of KΩ, thereby causing an electric current ($110V/r_0$) to be produced. Because the two power lines are respectively connected through the electric current transducer $CT_2$ at this time, forward current and backward current neutralize each other, and a leakage current $io_2$ is left. This leakage current forms a Hall voltage $V_H$ due to Hall effect, which is amplified by an amplifier OP, then amplified by a transistor amplification circuit for output to the OR gate of the diode, causing the SCR 2 to be triggered, and therefore power supply is cut off to prevent an accident.

Referring to FIGS. 1 and 2 again, when the SCR 2 is triggered due to an overcurrent, the AC relay 1 works, the normal open contact (N.O.) is on, therefore the alarm lamp L is turned on to give a visual warning signal.

Figure 3:
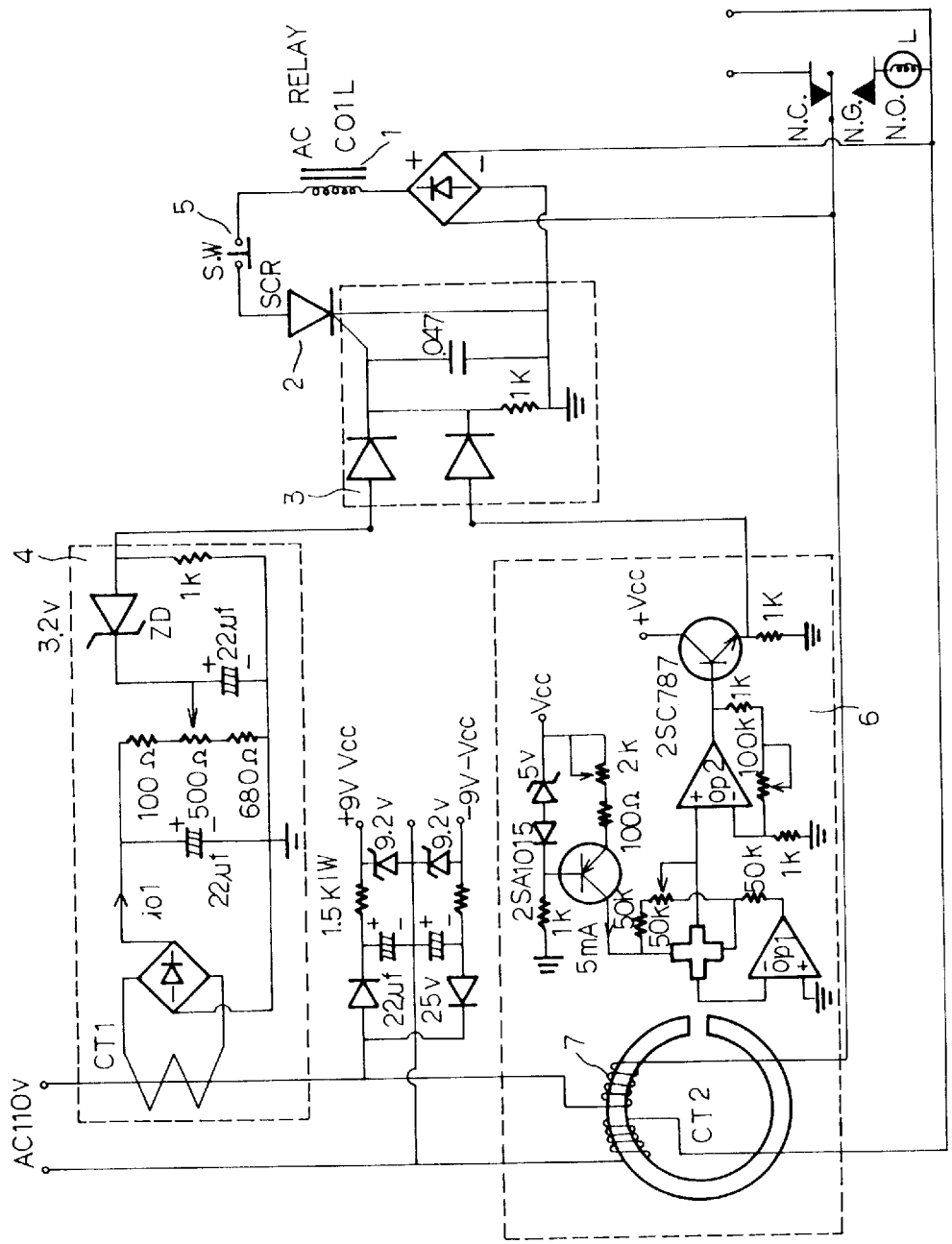
FIG. 3 shows the overcurrent protection circuit of FIG. 1 and the electric leakage protection circuit of FIG. 2 combined into a circuit assembly.

FIG. 1 shows an overcurrent or short circuit protection circuit. FIG. 2 shows a leakage protection circuit. FIG. 3 shows the overcurrent protection circuit of FIG. 1 and the leakage protection circuit of FIG. 2 joined by the OR gate of a diode.

When the reset switch (SW) 5 is pressed on, the SCR 2 is off, and the AC relay 1 is reset. Alternatively disconnecting the electric socket from power supply causes the SCR 2 to be off, and therefore the AC relay 1 is reset.

It is to be understood that the drawings are designed for purposes of illustration only, and are not intended as a definition of the limits and scope of the invention disclosed.

What the invention claimed is:

1. An overcurrent protection circuit comprising:

an AC relay;

a silicon controlled rectifier which controls said AC relay;

a trigger circuit which drive said silicon controlled rectifier;

a micro current detection amplifier which serves as a triggering signal source for said trigger circuit; and an alarm device; wherein said AC relay has a common contact connected to a first power line, a normal close contact for electric current output of said first power line to which said common contact is connected, and a normal opening contact bridged to a second power line through said alarm device, characterized in that said micro current detection circuit comprising:

a winding enclosing a power wire of an AC current; said winding being induced to generate a current due to a current flow in the power wire;

a diode connected to said winding CT1; one input ends of said diode in forward biased direction being grounded a first capacitor and a plurality of serial connected first resistors; said first capacitor and said plurality of serial connected first resistors are connected in parallel as a RC pair, two end of the RC pair being connected to two end of the diode;

a second, capacitor and a Zener diode which are connected in series as a first pair CZ pair, said CZ pair is coupled to one of said plurality of first resistors; and a second resistor which are connected in parallel to the CZ pair; one end of the CZ pair is grounded and another end of said CZ pair is as an output of said micro current detection circuit.

2. The overcurrent protection circuit as claimed in claim 1, wherein said alarm device is a lamp.

3. The overcurrent protection circuit as claimed in claim 1, wherein a reset switch is connected in series to a base of said silicon controlled rectifier.

* * * * *